3,054,687
RETARDATION OF SET TIME OF AQUEOUS
GYPSUM COMPOSITIONS
Robert S. Montgomery, Midland, Mich., and Henry M. Tobey, Memphis, Tenn., assignors to The Dow Chemical Company, Midland, Mich., a corporation of Delaware
No Drawing. Filed Apr. 14, 1960, Ser. No. 22,095
5 Claims. (Cl. 106—111)

The invention relates to the use of an additament in aqueous gypsum compositions to retard the setting time thereof.

The term gypsum as used herein refers to $CaSO_4$-containing compositions including substantially anhydrous $CaSO_4$, e.g., anhydrite, the hydrated forms, e.g., plaster of Paris and $CaSO_4 \cdot 2H_2O$, and $CaSO_4$ intermixed with reinforcing fibers or fillers.

Aqueous slurries of $CaSO_4$ are extensively used in the production of molded articles, e.g., casts, and for providing protective, insulating, or strengthening adhesive coatings commonly referred to as plaster, to panels thus coated, and to $CaSO_4$-containing compositions consisting of such plasters admixed with fibrous or other filler or reinforcing material, sometimes broadly referred to as plasterboard.

In the manufacture of $CaSO_4$-containing products, the usual practice is to admix powdered $CaSO_4$ or hydrate thereof with water to make a thick slurry or paste, mold the paste into the desired form or shape, and permit it to stand for a relatively short period of time during which it sets to a hard unitary mass having the shape of the molded paste.

A condition existent in the art of $CaSO_4$ usage has been its relatively rapid set. A number of attempts have been made to retard the setting thereof but none has been fully satisfactory. A further condition existent in the art of $CaSO_4$ usage has been its high viscosity unless excessive water is used in preparing the slurry or paste. Some retardants employed have had a concomitant undesirable effect such as increasing the viscosity of the paste or impairment of the ultimate strength of the product. Materials employed to reduce the viscosity of the paste during molding have similarly usually adversely affected other properties of the composition, e.g., its molding properties or its strength.

A desideratum in the use of $CaSO_4$-containing molding or plastering material, therefore, is a retardant which may be admixed with the aqueous $CaSO_4$ slurry to provide a desirable setting period without accompanying undesirable effects. A further desideratum is to provide such retardant which increases the fluidity and improves the molding properties of the $CaSO_4$-containing molding material.

The principal object of the invention is to provide an aqueous $CaSO_4$-containing slurry having improved molding and setting properties. A further object is to provide a method of making articles of a $CaSO_4$-containing composition having general utility for molding articles, e.g., casts, molds, forms, ornamental objects, construction panels and for making an adhesive plaster for application to solid surfaces.

The manner by which these and related objects are attained is made clear in the ensuing description and is defined in the appended claims.

The invention is a composition of matter comprising $CaSO_4$, water, and a retardant to the setting of the composition selected from the class consisting of coal acids and water-soluble salts of coal acids, and method of making molded objects or plastered surfaces employing such composition. Coal acids are hygroscopic, usually yellowish, essentially water-soluble substances prepared by oxidizing coal as hereinafter illustrated. The coal acids are at least about 90 percent aromatic polycarboxylic acids. The average molecular weight of the coal acids is usually about 250. They ordinarily have between about 2.5 and 5 carboxyl groups per molecule with an apparent average of between 3 and 4. The preponderant proportion of the aromatic nuclei of coal acids consists of methylnaphthalene, benzene, biphenyl, naphthalene, phenanthrene, alkyl benzene, benzophenone, and toluene. The invention includes within its purview the employment of synthetic organic acid mixtures or salts thereof having compositions of the nature of coal acids or the water-soluble salts of such acids since coal acids are considered to consist of at least about 90 percent by weight aromatic carboxylic acids, accordingly such acids and salts thereof are satisfactory for the practice of the invention.

Salts of coal acids may be made by (1) admixing powdered coal with an aqueous solution of a soluble hydroxide, usually an alkali metal hydroxide, in a suitable reactor provided with pressurizing and heating means and connected to a source of gaseous oxygen, (2) heating the mixture thus made at a temperature of between about 200° and 300° C. at a pressure of between 1000 and 2000 p.s.i. while supplying oxygen gas at a rate sufficient to provide a weight ratio of preferably at least 1 of oxygen to 5 of coal per minute; higher oxygen to coal ratios are desirable. The product thus produced is the salt formed by the reaction between the metal hydroxide employed and carboxylic acids derived from the coal, chiefly polycarboxylic aromatic acids, e.g., the di- and polycarboxylic acids of benzene, toluene, naphthalene, phenanthrene, biphenyl, terphenyl, and such aromatic carboxylic acids having alkyl substituents on the ring carbon atoms.

The coal acids and/or water soluble salts thereof may be employed in the practice of the invention at any temperature between the freezing and boiling points of water. For example, satisfactory retardant effects were obtained in the practice of the invention when the $CaSO_4$ composition was maintained at 100° C. during the setting thereof. The temperatures usually employed are about room temperature.

Discussions of the preparation of coal acids and their salts may be found in Chemical Industries, 58, pages 580 and 581 (1946); Industrial Engineering Chemistry, 44, pages 2784 to 2792 (1952); Fuel, 35, pages 49 to 65 (1956); Fuel, 36, pages 63 to 75 (1957); and in U.S. Patents 2,826,515 and 2,895,934.

The invention is carried out by admixing a small but effective amount of coal acids, water-soluble salts thereof, or mixture of such acids and their salts, with water and pulverulent $CaSO_4$, either anhydrous or in one of its hydrated forms, to make a paste, forming the paste thus prepared into the desired shape of an article to be made, and allowing the article so formed to stand until the paste has set to a hard unitary solid. It should be borne in mind that the setting time is considered the time required for the $CaSO_4$-containing composition to set to a solid but is not the full time necessary for the composition to acquire full strength. A conditioning time of several hours is usually employed following the set of the composition to acquire its full strength.

The practice of the invention provides a method of extending the setting time of $CaSO_4$-containing aqueous slurries or pastes to any practical setting time desired and also increasing the fluidity and molding properties thereof. A setting time of 5 minutes or less is common with $CaSO_4$-containing compositions in the absence of a retardant. Setting times in excess of 5 minutes are often essential to satisfactory shaping of $CaSO_4$-containing aqueous compositions and usually at least 10 minutes are required. A setting time of between 10 and 20 minutes is generally desirable for making relatively simple shapes and for complex configurations, e.g., statuettes and the like, times considerably in excess of 20 minutes are desirable. The length of the setting time of a given composition comprising water and $CaSO_4$ and the coal acids or salts thereof in accordance with the invention is dependent largely upon the percent of coal acids and/or salts thereof employed. As little as 0.01 percent of the coal acids and/or salts thereof based on the $CaSO_4$ content of the paste, provides an appreciable increase in setting time. More than 1.0 percent of the coal acids and/or salts thereof is not usually recommended. Greater amounts than 1.3 to 1.5 percent tend to prevent the $CaSO_4$-containing slurries from setting at all. The recommended amount of the coal acids and/or salts thereof to employ in the practice of the invention is between 0.02 and 0.05 percent based on the $CaSO_4$ content of the aqueous slurry or paste.

Two series of runs were made employing aqueous $CaSO_4$-containing slurries. Each series of runs contained a blank run according to conventional practice, for purposes of comparison, wherein no coal acid nor salts thereof were employed, and examples of the practice of the invention. Series 1 was run to show the effect of the presence of coal acids or salts thereof on the molding properties and setting time of the $CaSO_4$-containing aqueous compositions. Series 2 was run to show the effect, if any, of the presence of coal acids or salts thereof on the ultimate tensile strength of the set $CaSO_4$-containing composition as determined by a standard tensile strength test.

SERIES 1

*Run A for Purposes of Comparison*

One hundred grams of calcined gypsum known as "board plaster" were admixed with 80 grams of water at room temperature and allowed to set according to conventional practice. The molding characteristics of the paste were examined and found to be not fully satisfactory because of undesirably high viscosity. The setting time was measured and found to be 5 minutes.

EXAMPLE 1

Run A, i.e., the comparative test, was repeated except that 0.02 gram of the sodium salt of coal acids was admixed with the aqueous slurry of calcined gypsum. The molding properties were superior to those of the comparative test. The setting time was 12 minutes.

EXAMPLE 2

Run A was again repeated except that 0.05 gram of the sodium salt of coal acids was admixed with the aqueous slurry of calcined gypsum. The paste thus prepared was readily moldable due to a reduction in viscosity from that of the comparative run. The setting time was 20 minutes.

Each of the set pieces of the calcined gypsum composition prepared above were examined and tested after about two days, for strength and found to be substantially the same in appearance and to have substantially equal strength properties.

SERIES 2

*Run B for Purposes of Comparison*

An aqueous composition consisting of 150 grams of anhydrous $CaSO_4$ and 120 grams of water was prepared according to conventional practice at room temperature. The composition was molded into two elongated briquets having a square cross-section and somewhat enlarged rounded ends. The briquets were about 3 inches long, 1 inch square midway between the ends, and were knob-like at the ends to provide a firm gripping means for clamping one end of the briquet in a vertical position and for securing weights to the other end. The briquets thus made were allowed to condition, i.e., allowed to stand until maximum strength was assured, in accordance with commonly employed testing procedure. The conditioning period employed was 70 hours. The briquets were then tested for tensile strength and each found to have a tensile strength value of 155 pounds per square inch.

EXAMPLE 3

The aqueous composition of Run B was again prepared except 0.05 percent of the sodium salt of coal acids, based on the $CaSO_4$ content, was admixed therewith. Two briquets were prepared, as in Run B, and tested for tensile strength. The tensile strength values were 155 and 140 pounds per square inch.

EXAMPLE 4

The procedure of Example 3 was repeated except the percent of the sodium salt of coal acids employed was 0.02 percent, based on the $CaSO_4$ content of the aqueous composition. Two briquets were again prepared therefrom as above. The tensile strength values of the two briquets made therefrom were 180 and 150 pounds per square inch.

EXAMPLE 5

The procedure of Example 3 was repeated except that 0.05 percent of coal acids were employed, instead of the sodium salts thereof. Two briquets were made therefrom. The tensile strength values of the two briquets made were 170 and 190 pounds per square inch.

EXAMPLE 6

The procedure of Example 3 was repeated except that 0.02 percent of the coal acids was employed instead of 0.05 percent of sodium salt thereof. Two briquets of the type described above were prepared. The tensile strength of two briquets made from the $CaSO_4$-containing composition were 155 and 160 pounds per square inch.

An examination of the results of Series 2 shows that the presence of the coal acids or sodium salts thereof in the $CaSO_4$-containing composition had no adverse effect on the tensile strength of the set $CaSO_4$ composition.

Having described the invention, what is claimed and desired to be protected by Letters Patent is:

1. An aqueous composition that sets to a hard unitary solid consisting essentially of a mixture of $CaSO_4$ and a retarder selected from the class consisting of coal acids containing at least about 90% aromatic carboxylic acids, water-soluble salts thereof, and mixtures of said acids and salts, said retarder being present in an amount between 0.01 and 1.5% by weight of the $CaSO_4$, to provide a setting time for said composition of at least about 10 minutes and not over about 1 hour.

2. A method of making molded articles consisting essentially of the steps of: admixing water and a sufficient amount of a $CaSO_4$-containing pulverulent material to give a deformable mass capable of setting to a unitary solid on standing with an amount of a retarder in an amount between 0.01 and 1.5% thereof, based on the weight of $CaSO_4$ present, said retarder being selected from the class consisting of coal acids and water-soluble salts of coal acids, and mixtures of such acids and salts, said acids consisting of at least about 90% by weight of aromatic polycarboxylic acids, to give a setting time in excess of 5 minutes but less than about an hour; forming the thus retarded deformable mass into a desired configuration; and allowing the thus formed mass to set to a hard unitary solid having substantially the shape of the formed mass.

3. An aqueous composition which sets to a hard unitary solid consisting essentially of a mixture of $CaSO_4$ and a retardant to set selected from the class consisting of coal acids, water-soluble salts of said acids, and mixtures of said acids and salts, said retardant being present in an amount between 0.01 and 1.5 percent by weight of the $CaSO_4$ present.

4. The method of claim 2 wherein the retarder is a mixture of coal acids and sodium, potassium, and lithium salts of said acids.

5. The method of claim 4 wherein the retarder is admixed in an amount of between 0.01 and 1.0 percent by weight of $CaSO_4$ present in said mass.

References Cited in the file of this patent

UNITED STATES PATENTS

| | | |
|---|---|---|
| 1,099,974 | Ellis | June 16, 1914 |
| 1,844,662 | King | Feb. 9, 1932 |
| 2,113,375 | Hinsworth | Apr. 5, 1938 |
| 2,318,540 | Tolbert | May 4, 1943 |
| 2,448,218 | Haddon | Aug. 31, 1948 |
| 2,499,445 | Ammann | Mar. 7, 1950 |
| 2,913,308 | Darby | Nov. 17, 1959 |